(12) United States Patent
Fang et al.

(10) Patent No.: US 8,631,207 B2
(45) Date of Patent: Jan. 14, 2014

(54) CACHE MEMORY POWER REDUCTION TECHNIQUES

(75) Inventors: Zhen Fang, Portland, OR (US); Meenakshisundara R. Chinthamani, Hillsboro, OR (US); Li Zhao, Beaverton, OR (US); Milind B. Kamble, Austin, TX (US); Ravishankar Iyer, Portland, OR (US); Seung Eun Lee, Hillsboro, OR (US); Robert S. Chappell, Portland, OR (US); Ryan L. Carlson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 12/647,461

(22) Filed: Dec. 26, 2009

(65) Prior Publication Data

US 2011/0161595 A1 Jun. 30, 2011

(51) Int. Cl.
*G06F 12/00* (2006.01)

(52) U.S. Cl.
USPC .................. 711/128; 711/129; 711/E12.018

(58) Field of Classification Search
None
See application file for complete search history.

(56) References Cited

U.S. PATENT DOCUMENTS

| | | | | |
|---|---|---|---|---|
| 5,214,610 A | * | 5/1993 | Houston | 365/233.5 |
| 5,732,242 A | * | 3/1998 | Mowry | 711/136 |
| 5,787,267 A | * | 7/1998 | Leung et al. | 711/105 |
| 5,835,951 A | * | 11/1998 | McMahan | 711/145 |
| 6,000,007 A | * | 12/1999 | Leung et al. | 711/105 |
| 6,167,486 A | * | 12/2000 | Lee et al. | 711/120 |
| 6,425,055 B1 | * | 7/2002 | Sager et al. | 711/118 |
| 6,493,812 B1 | * | 12/2002 | Lyon | 711/207 |
| 6,622,208 B2 | * | 9/2003 | North | 711/118 |
| 6,622,211 B2 | * | 9/2003 | Henry et al. | 711/128 |
| 6,629,207 B1 | * | 9/2003 | Yoshioka et al. | 711/125 |
| 6,681,295 B1 | * | 1/2004 | Root et al. | 711/128 |
| 6,944,713 B2 | * | 9/2005 | Clark et al. | 711/128 |
| 6,961,824 B2 | * | 11/2005 | Rowlands et al. | 711/137 |
| 6,996,675 B2 | * | 2/2006 | Gilbert | 711/128 |
| 7,315,920 B2 | * | 1/2008 | Quach et al. | 711/145 |
| 7,386,701 B2 | * | 6/2008 | Mowry | 711/204 |
| 7,392,347 B2 | * | 6/2008 | Briggs | 711/129 |
| 7,451,271 B2 | * | 11/2008 | O'Connor | 711/118 |
| 7,562,191 B2 | * | 7/2009 | Knoth | 711/128 |
| 7,596,663 B2 | * | 9/2009 | Mouton et al. | 711/128 |
| 7,657,708 B2 | * | 2/2010 | Knoth et al. | 711/128 |
| 7,761,661 B2 | * | 7/2010 | O'Connor | 711/118 |
| 7,900,020 B2 | * | 3/2011 | Williamson et al. | 711/216 |

(Continued)

OTHER PUBLICATIONS

Jim Handy, "The Cache Memory Book: The Authoritative Reference on Cache Design", Second Edition, 1998, pp. 88-95, 210-211, and 216-217.*

Webopedia, "Multi-Core Technology", Feb. 28, 2008, pp. 1-2, http://web.archive.org/web/20080228000102/http://www.webopedia.com/TERM/M/multi_core_technology.html.*

(Continued)

*Primary Examiner* — Edward Dudek, Jr.
*Assistant Examiner* — Christopher Birkhimer
(74) *Attorney, Agent, or Firm* — Trop, Pruner & Hu, P.C.

(57) ABSTRACT

Methods and apparatus to provide for power consumption reduction in memories (such as cache memories) are described. In one embodiment, a virtual tag is used to determine whether to access a cache way. The virtual tag access and comparison may be performed earlier in the read pipeline than the actual tag access or comparison. In another embodiment, a speculative way hit may be used based on pre-ECC partial tag match to wake up a subset of data arrays. Other embodiments are also described.

19 Claims, 11 Drawing Sheets

(56) References Cited

U.S. PATENT DOCUMENTS

| | | | |
|---|---|---|---|
| 8,225,046 B2* | 7/2012 | Licht et al. | 711/128 |
| 2006/0212648 A1* | 9/2006 | Cox et al. | 711/108 |
| 2008/0046652 A1* | 2/2008 | Knoth et al. | 711/128 |
| 2008/0082721 A1* | 4/2008 | Yu et al. | 711/3 |

OTHER PUBLICATIONS

Bose, "Bose MediaMate Computer Speakers: Owner's Guide", Oct. 29, 2001, pp. 1-16, http://worldwide.bose.com/commom/en/assets/pdf/guides/speakers/mediamate/en/owg_en_mediamate.pdf.*

* cited by examiner

Speculative Way Hit

- Split tag bits into 2 groups:

$Tag_u$ = Uncorrected tag = $\{A_u, B_u\}$ $Tag_c$ = Corrected tag = $\{A_c, B_c\}$

- Likewise, split incoming AddrTag bits:

AddrTag = $\{a, b\}$

- RealWayHit: $(A_c==a)$ & $(B_c==b)$
- SpecWayHit: $(A_u==a)$ | $(B_u==b)$
- If RealWayHit=1 then SpecWayHit=1
- If SpecWayHit=0 then RealWayHit=0
    - If no bit errors then $(A_c = A_u)$ and $(B_c = B_u)$
    - On a single bit error, either $(A_c = A_u)$ or $(B_c = B_u)$
    - Double bit errors are unrecoverable FIG. 8   For A and B, we looked at Odd & Even bits of Tag

FIG. 12

CACHE MEMORY POWER REDUCTION TECHNIQUES

FIELD

The present disclosure generally relates to the field of computing. More particularly, an embodiment of the invention generally relates to techniques for power reduction in memories such as cache memories.

BACKGROUND

To improve performance, most modern processors include on chip cache memory. Generally, data stored in a cache is accessible may times faster than data stored in the main system memory. However, as caches become larger, they also consume a larger amount of power. Accordingly, power reduction techniques in a cache may reduce overall power consumption in a computing system.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof. Also, the use of "instruction" or "micro-operation" (which may also be referred to as "uop") herein may be interchangeable.

Some of the embodiments discussed herein provide for power reduction techniques in memory devices (such as cache memories). For example, the Level 1 Data (L1D) cache on some processor cores (such as x86 processor cores) may be virtually-indexed and physically-tagged. In a high-performance processor pipeline for a load instruction, due to tight timing constraints, in an N-way set associative cache, all N data blocks of the selected set are accessed in parallel with the tag lookup. N−1 of the N data blocks may be discarded later, constituting a waste of power. In an embodiment, this power inefficiency is mitigated without impact to the L1D cache hit latency.

In one embodiment, the physically-tagged L1D cache is augmented with a Vtag (Virtual tag) array (the highest virtual address bit in an embodiment). As discussed herein, a Vtag may be the same as a physical tag except that it consists of virtual address bit(s). In some embodiments, Vtag access and comparison are performed earlier in the read pipeline than the actual tag access/comparison, thus avoiding impact to the critical path of the L1D access. Moreover, data array accesses may be executed only for the ways whose Vtags match, as opposed to accessing all ways as is done in some of the current cache designs. For example, using the Most Significant Bit (MSB) of the virtual block address as the Vtag may reduce data array accesses for L1D reads significantly. The reason that a single bit can be so effective is that the MSB has clear virtual memory semantics, e.g., by differentiating the heap area and the stack area. The MSB bit may indicate to an incoming stack read not to pursue the ways that contain heap data, and vice versa. This solution may also be use more bits, although fewer bits may provide lower Vtag-related overhead in some embodiments. for example, in one embodiment, multiple virtual address bits may be used for the Vtag as opposed to just using the MSB. This may further reduce the number of Vtag matches in a set; therefore, avoiding more data array accesses.

Additionally, in an embodiment, to reduce power consumption, the number of Word Line (WL) firings in a memory (such as a cache memory) are reduced without any loss of performance. For example, a speculative way hit may be based on pre-ECC (Error Correction Code) partial tag match and waking up of a subset of data arrays based on the results from the match. In one embodiment, the LLC (Last Level Cache) latency is increased by one cycle (e.g., as discussed below with reference to FIGS. 6 and 7), but the increase in turn causes saving of both leakage and dynamic power by reducing the number of data arrays that are woken up and firing only necessary word-lines.

Figure 1:
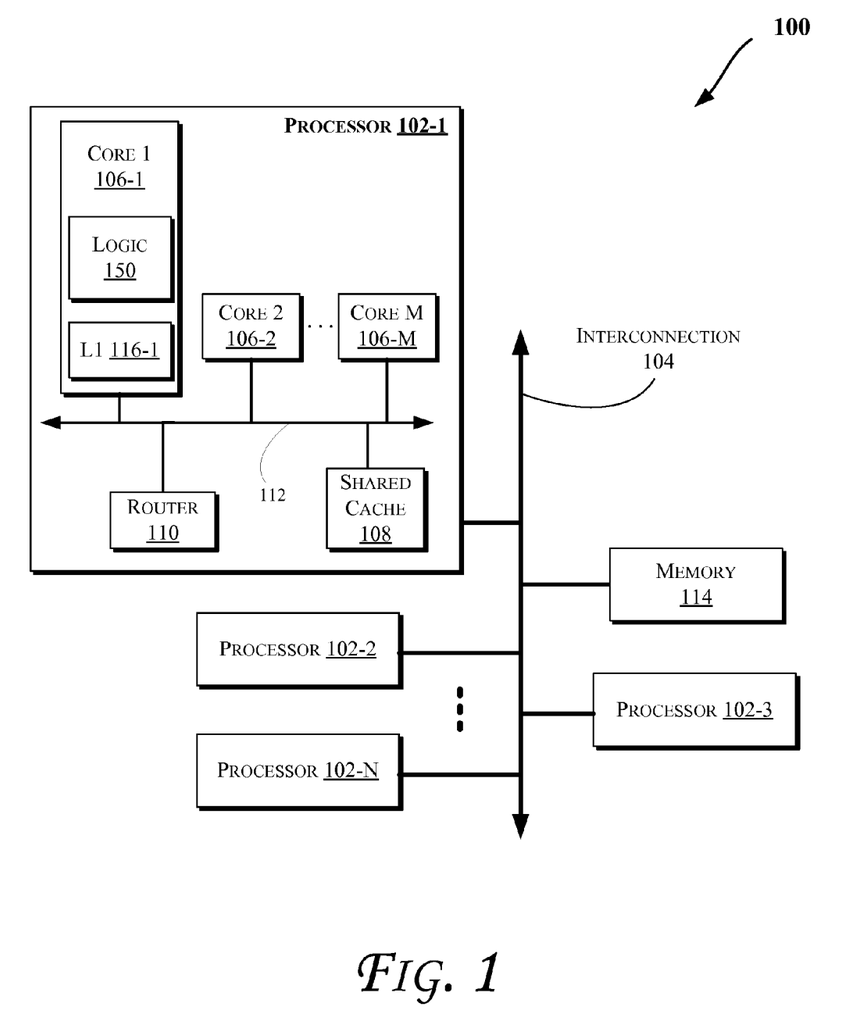
FIGS. 1, 10, and 11 illustrate block diagrams of embodiments of computing systems, which may be utilized to implement some embodiments discussed herein.

Techniques described herein may allow for improved encryption/decryption performance in various computing devices, such as those discussed for example with reference to FIGS. 1-12. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC)

chip. Moreover, the chip may include one or more shared and/or private caches (such as cache 108), buses or interconnections (such as a bus or interconnection network 112), memory controllers (such as those discussed with reference to FIGS. 10 and 11), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (MLC) (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown). As discussed herein, L1 cache may refer to an L1 Data (L1D) cache and/or L1 instruction cache.

As shown, processor core 106 may include a logic 150 to utilize a Vtag to perform a comparison earlier in the read pipeline ahead of L1D access (e.g., as will be further discussed herein with reference to FIGS. 2A-4) and/or perform a speculative way hit based on pre-ECC partial tag match and waking up of a subset of data arrays based on the results from the match (e.g., as will be further discussed herein with reference to FIGS. 5-9). Furthermore, even though some figures illustrate logic 150 to be inside a processor or core, logic 150 may be provided within other components of computing systems discussed herein, such as within any components of systems discussed with reference to FIG. 1, 10, or 11.

Figure 2A:
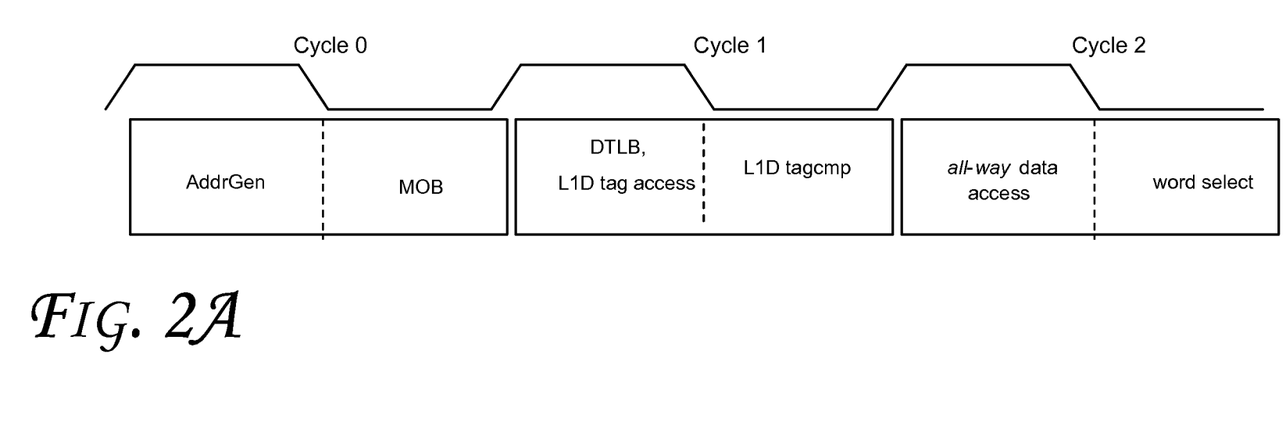
FIGS. 2A-2B illustrate sample read pipelines.

FIG. 2A shows one implementation of a read pipeline. Because the cache tags use physical address bits, tag comparison cannot start until a Translation Lookaside Buffer (TLB) has completed the virtual-to-physical address translation. To complete L1D read by cycle 2L (the logic low of cycle 2 at word select), the data array accesses have to start in cycle 2H (the logic high of cycle 2 at all-way data access), at which time the way selection signals are not yet available to the data array. As a result, all N ways of cache blocks in the current set are read out of the data array. On a cache hit, N−1 of the N blocks are discarded in cycle 2L.

Figure 3:
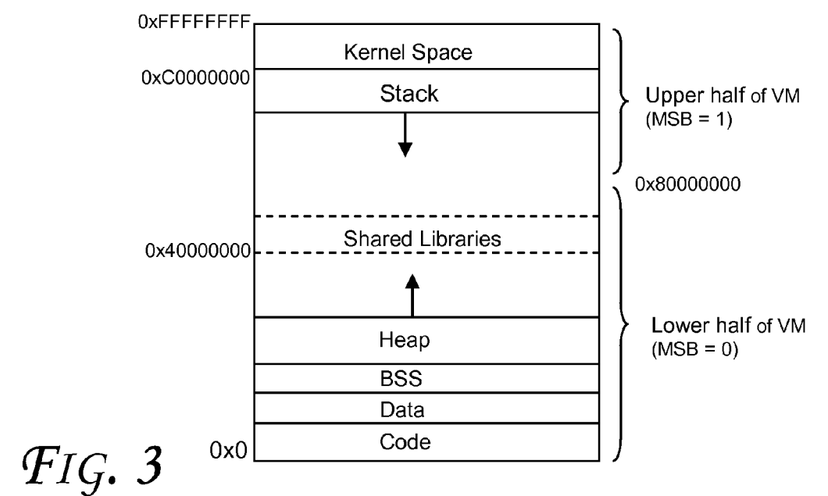
FIG. 3 illustrates a virtual address space according to an embodiment.

An embodiment checks a small number of virtual address bits between the memory address and the N stored cache lines in the selected set. A data block is read only if the virtual tags match. In one embodiment, each cache line with the highest bit of the 32-bit virtual address is tagged. Furthermore, the MSB of the linear address provides clear virtual memory semantics. As illustrated in FIG. 3 (which shows a 32-bit virtual address space according to an embodiment), for the vast majority of applications, MSB of the stack area is 1 and MSB of the heap area is 0. In the extreme case when that is no longer true, the OS (Operating System) may simply disable the use of Vtag for the violating process. On 64-bit machines, the possibility of this address space shortage situation is believed to be even more remote.

Figure 2B:
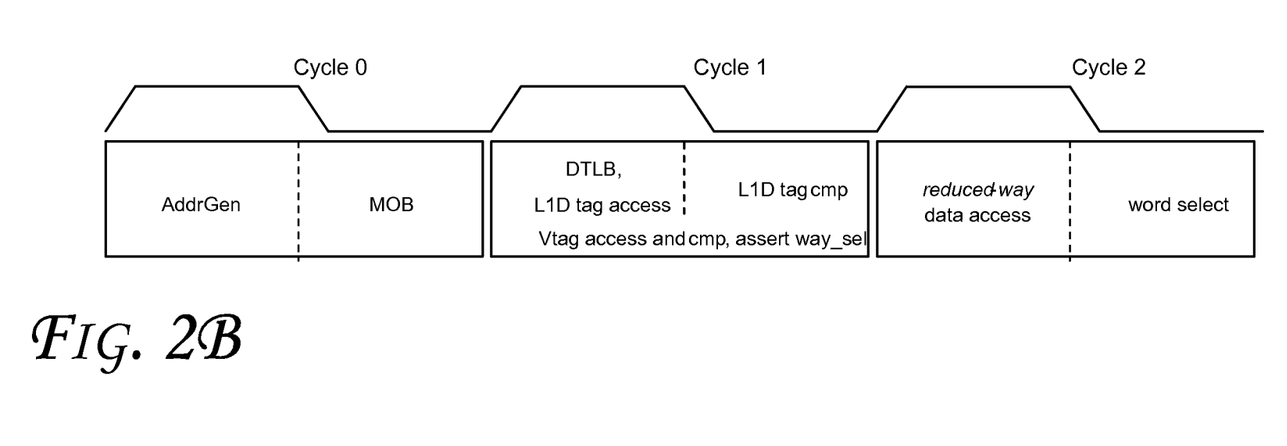

In some embodiments, read hit latency is not affected. Unlike physical tags which may be only available after the TLB translation, a Vtag is ready to use after address generation, as shown in FIG. 2B. The Vtag check signals will be available to the L1D in cycle 1L. Note that in FIG. 2A, way selection signals cannot reach the data array in time to perform reduced-way data access.

Figure 4:
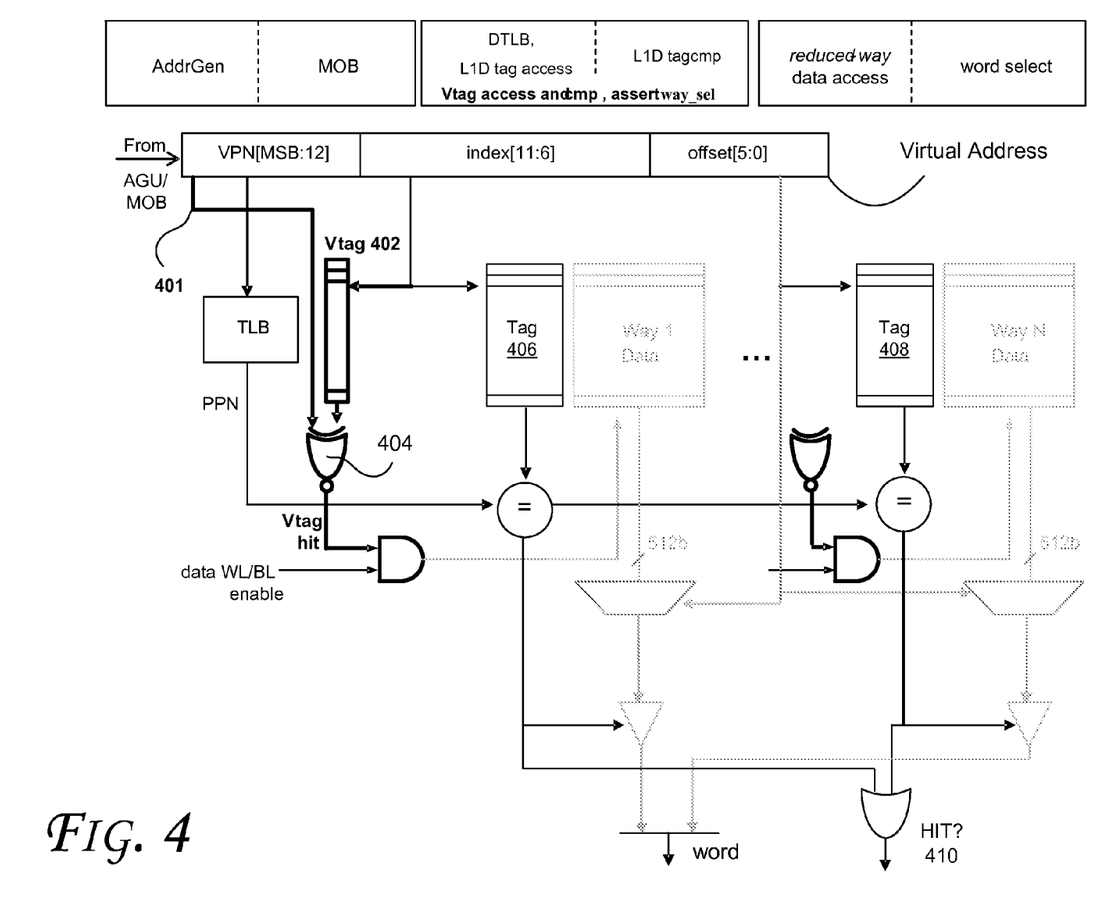
FIG. 4 illustrates a simplified organization of an optimized read port, according to an embodiment.

FIG. 4 illustrates a simplified organization of the optimized L1D read port, according to an embodiment. The status array is omitted for simplicity. Bold components indicate logic to utilize Vtag access and comparison path performed earlier in the read pipeline. Grey components illustrate power-saving opportunities. As shown, a virtual address is obtained from an Address Generation Unit (AGU) or Memory Ordering Buffer (MOB). As shown, the MSB 401 of the virtual address is used in conjunction with Vtag 402 to determine whether there is a Vtag hit (e.g., generated by the NOR gate 404). The Vtag hit signal is compared with entries from tags 406 and 408 to determine whether a hit 410 has occurred.

In some embodiments, a stack variable and a heap variable may share a same physical memory block, e.g., as a result of the mmap( ) system call in accordance with at least one instruction set architecture. Vtag would give us a false miss in the L1D. If the L1D cache line is in M (modified) state, the miss will cause obsolete data from low-level memory to overwrite the dirty copy in L1D. Intentional virtual address aliasing is generally rare in practice. We only need to ensure program correctness when a false miss occurs. There are several solutions. A software solution is for the OS to disable Vtag usage for the current process when an alias mapping is created in the page table. A hardware solution is to nuke the consequent L1D miss request (in cycle 2 of FIG. 2) and re-execute data array access, if physical tag comparison does not agree with the Vtag check result. This one-cycle penalty only affects an aliased L1D read, and does not affect L1D hit or miss latencies for non-aliasing cases.

Moreover, some of embodiments discussed herein do not serialize the cache access process, which does not impact cache access time. Also, some of the embodiments discussed herein are oblivious of past accesses, and are not speculative in nature. Further, in one embodiment, multiple virtual address bits may be used for Vtag as opposed to just using the MSB. This may further reduce the number of Vtag matches in a set; therefore, avoiding more data array accesses. In an embodiment, instruction linear address bits may be used to optimize L1 instruction cache power. In the latter case, instruction linear address bits may differentiate user versus kernel code, and/or application versus shared library. Additionally, while some embodiments are discussed with reference to L1D herein, techniques discussed herein may be applied to other levels of cache (such as those discussed with reference to FIG. 1, including for example, L2, L3, etc.).

Figure 5:
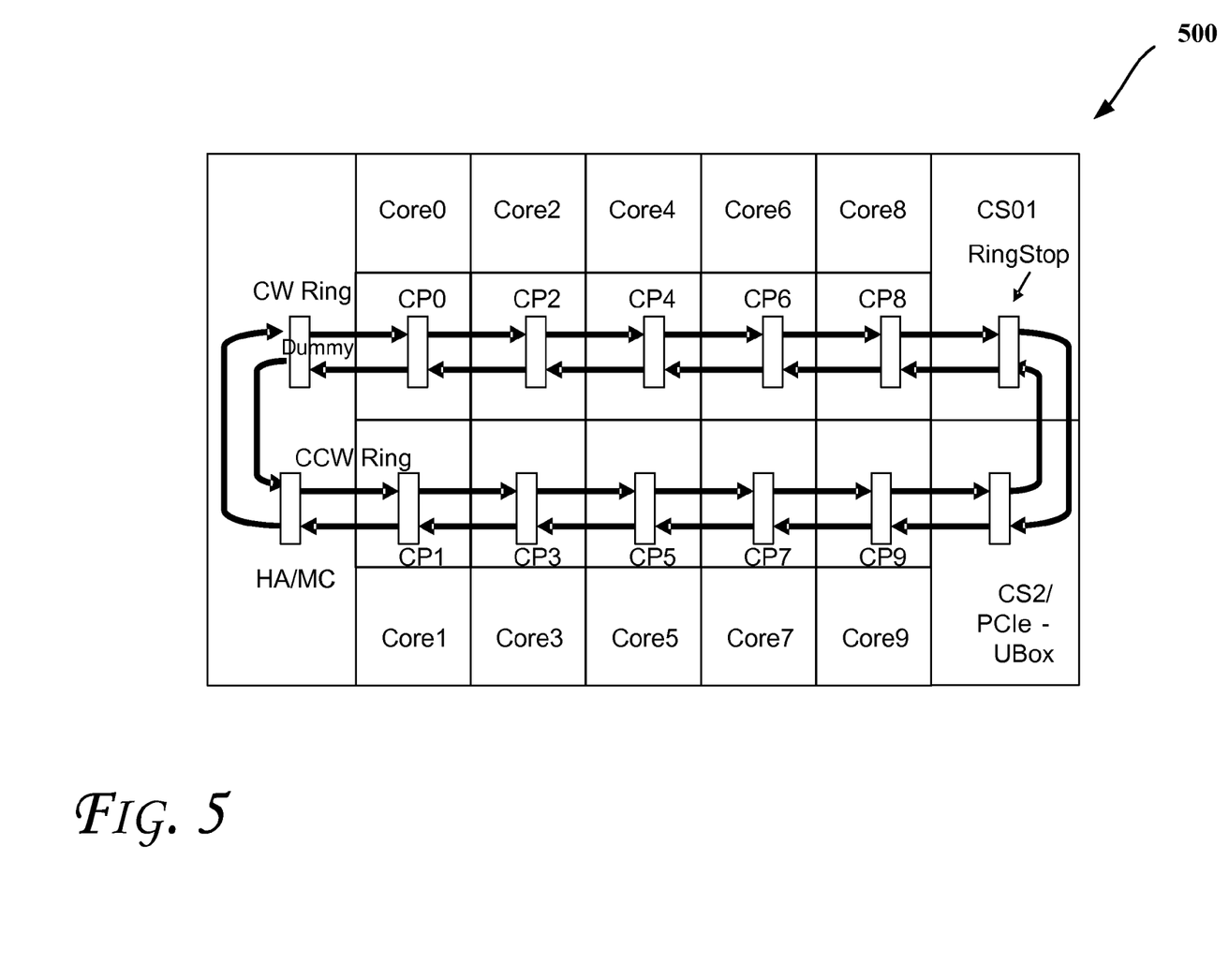
FIG. 5 illustrates a physically distributed and logically shared computing system, according to an embodiment.

FIG. 5 illustrates a physically distributed and logically shared cache memory subsystem in a multi-core computing system 500, according to an embodiment. As shown, system 500 includes multiple slices of caches CP0 to CP9 (e.g., physically partitioned and logically shared) coupled through a bi-directional ring architecture (where each coupling shown with a unidirectional arrow may be a unidirectional point-to-point coupling). As shown, each pair of caches may be coupled with two unidirectional couplings which together form a clockwise (CW) communication ring and the counter clockwise (CCW) communication ring. A homing agent (HA)/memory controller (MC) may be present in the system, along with a ring stop (CS01) and a PCIe (PCI express) UBox (CS2). As illustrated the rings may also be coupled to a dummy agent.

Figure 6:
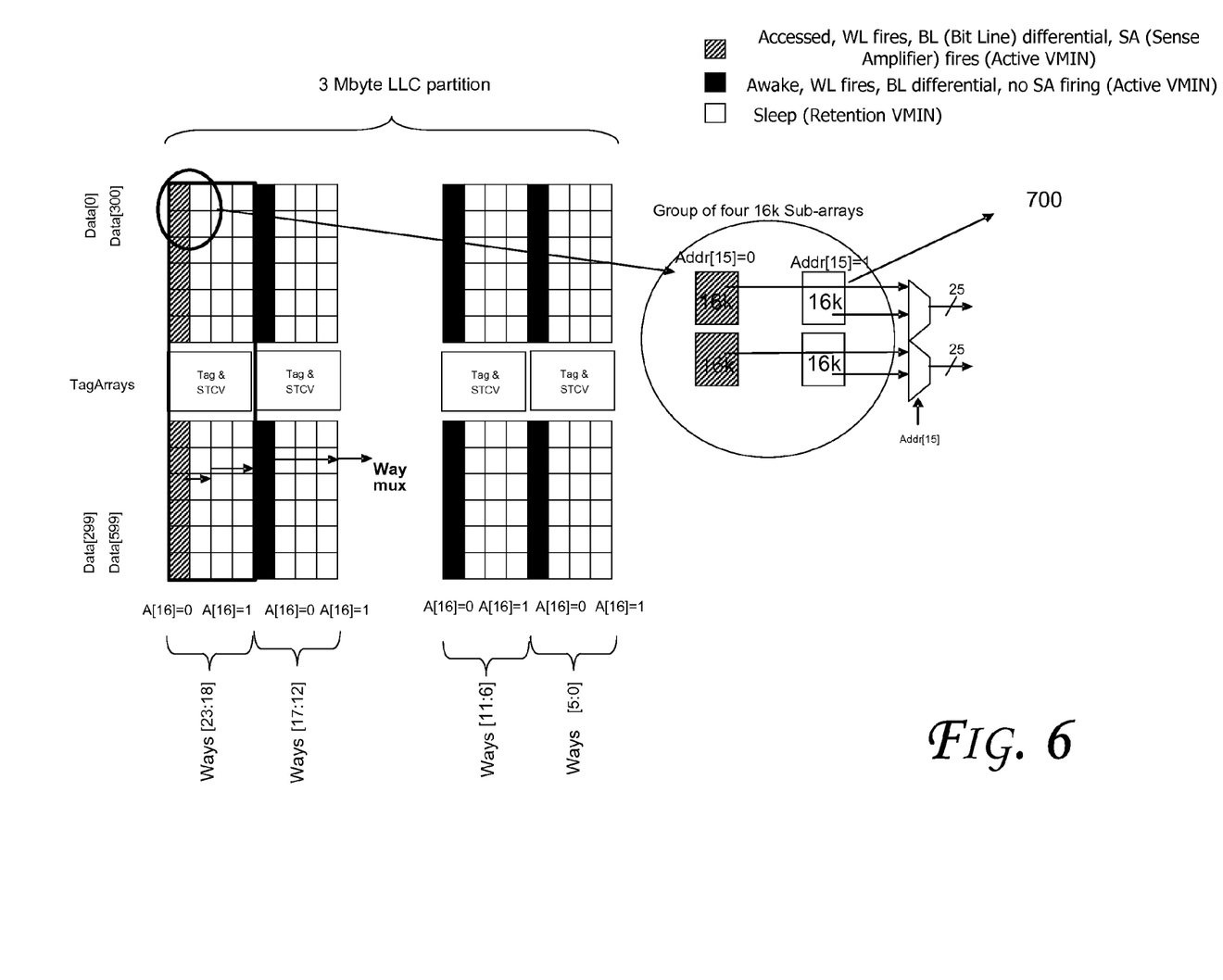
FIGS. 6-7 illustrate diagrams of the organization of a cache data array, according to an embodiment.
Figure 7:
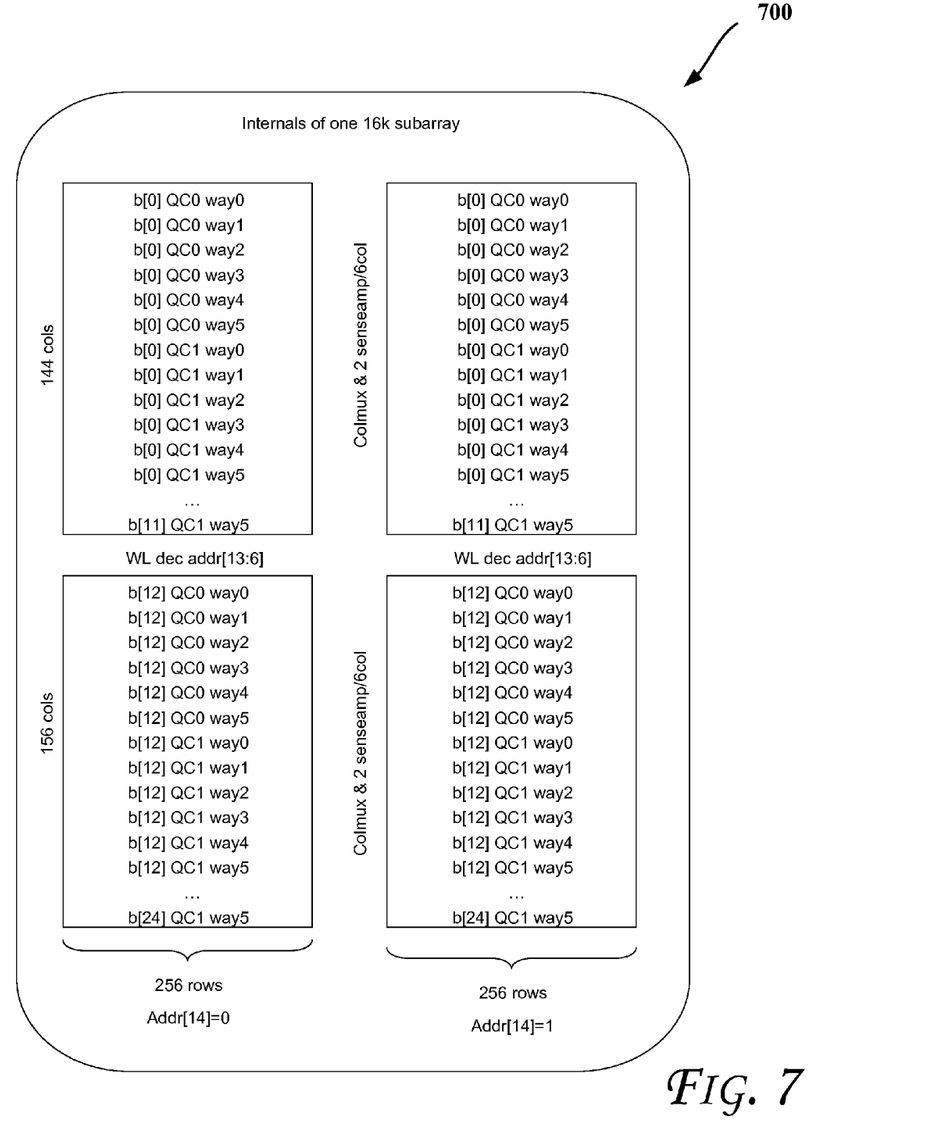

Referring to FIG. 6, an LLC data array organization is shown, according to an embodiment. Even though an LLC is discussed, the embodiments are applicable to other cache levels such as those discussed with reference to FIG. 1, for example. The LLC may include 192 data sub-arrays (see, e.g., FIG. 7 for details of a sample sub-array), each storing 16K bits (3 MB cache size). 3 MB data cache is assumed to be organized as 2K sets with 24-ways per set. STCV (State and Core Valid) arrays which couple various sub-arrays may store the state-bits and core-valid bit vector for all the cache lines. Core-valid vector is a presence vector that indicates which of the cores have a copy of a given cache line. In the baseline case (without the proposed power reduction techniques described herein), all the 48 sub-arrays (corresponding to all the 24-ways) are woken up and 48 WLs are fired. Then, the way hit information is used to column multiplex the bits in the SSAs to the sense amps. The way hit information is also used to generate sense amp enables in the 12 sub arrays corresponding to way-hit. Thus, the wakeup and firing of WL in the other 36 sub arrays contributes wasteful power. In-order to selectively wake-up 12 word lines corresponding to the select group of 6-ways, LLC controller has to wait for tag-match and tag-ECC correction to complete. For meeting RAS (Reliability, Availability, and Serviceability) requirements, server products are generally required to implement DECTED (Double Error correction Triple Error Detection) in the data arrays and SECDED (Single Error correction and Double Error Detection) in the tag arrays. The tag-ECC operation consumes an additional cycle. Generally, waiting for complete tag match and tag-ECC checking to complete to wake up and fire data sub-arrays adds two cycles to LLC-hit latency, resulting in loss of performance. Thus, there is a trade-off between less performance (two cycle increase in LLC latency) and higher power (waking up and firing of all the 48 WLs corresponding to 24-ways).

In some embodiments, each of the LLC slices, LLC data arrays may be implemented as SSAs (Small Signal Arrays) with embedded sleep circuitry to save power. To read a cache line, the appropriate data sub-arrays are woken up, the corresponding WLs (word lines) are fired, and sense amps enabled to output the data from the memory cells. Also, as shown in FIG. 6, the LLC partitions may have one or more of three distinct modes: accessed (e.g., corresponding to an energizing of sense amplifiers (SAs) of the data arrays with WL firing and BL (Bit Line) differential (e.g., cells at active Vmin)), awake (e.g., with WL firing, BL differential and no SA firing (e.g., cells at active Vmin)), and/or sleep (e.g., retention at minimum voltage level (e.g., cells at retention Vmin)).

Referring to Table 1 below (which lists some sample performance vs. power trade-off options), at row 2, to reduce power consumption, the number of word-line (WL) firings in a memory (such as an LLC) are reduced without any loss of performance (no increase in LLC access latency). At row 3, the LLC hit latency is increased by one cycle, but the increase in turn causes saving of both leakage and dynamic power by reducing the number of data arrays that are woken up and firing only necessary word-lines.

TABLE 1

| | Power Reduction Options | |
|---|---|---|
| LLC Latency (Uclks) | # of data sub-arrays that are woken-up | # of WLs that are fired |
| 11 (Baseline) | 48 | 48 |
| 11 (using a partial tag match on an un-corrected tag) | 48 | 12, 24, 36 or 48 |

TABLE 1-continued

| | Power Reduction Options | |
|---|---|---|
| LLC Latency (Uclks) | # of data sub-arrays that are woken-up | # of WLs that are fired |
| 12 | 12, 24, 36 or 48 | 12 |
| 13 | 12 | 12 |

In one embodiment, power optimization may be achieve by using a partial tag match based on the pre-ECC (un-corrected) tag and firing only a subset of WLs instead of all the 48. More specifically, the un-corrected pre-ECC tag may be split into Odd-bits and Even-bits in some embodiments. The partial tag match will be true, if either all the odd-bits match with the corresponding bits of the address tag or all the even-bits match with the corresponding bits of the address tag. If the partial tag match is false, then the real tag match (using all the bits of ECC-corrected tag) would be false (by definition) too. However, if the partial tag match is true, then the actual tag match could be either true or false. Thus, firing WLs based on partial tag match could result in firing more WLs than necessary. As reflected in row 2 of Table 1, the number of WLs fired could be 12, 24, 36 or 48 (depending on the workload).

Figure 8:
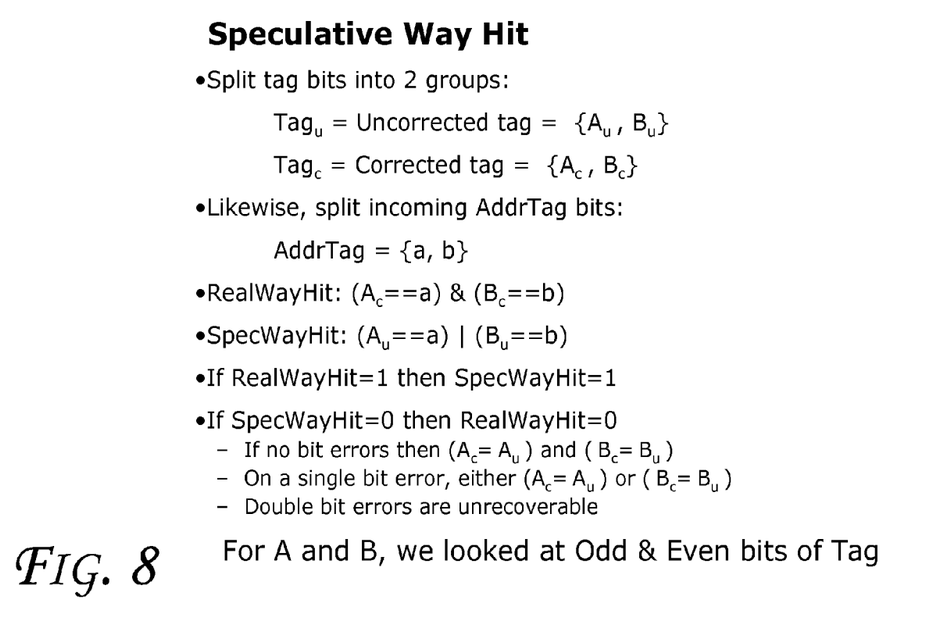
FIG. 8 illustrates sample details of a speculative way hit scheme, according to an embodiment.

The pseudo code shown in FIG. 8 provides sample details of speculative way hit scheme, according to an embodiment. As shown, tag bits are split into two groups. The incoming address tag bits may also be split as shown. Next, real way hit and speculative way hit are determined. If the real way hit is equal to one (indicating an actual hit) then the speculative way hit is set to one. If speculative way hit is zero (indicating no speculative hit), then the real way hit is set to zero. Furthermore, if no-bid errors are detected, the split tag bit groups are updated. For a single bit error, the split tag bit groups are updated as shown. In one embodiment, the double bit errors are unrecoverable. As will be further discussed herein, e.g., with respect to FIG. 9, for A and B, odd and even bits of tag may be considered.

Figure 9:
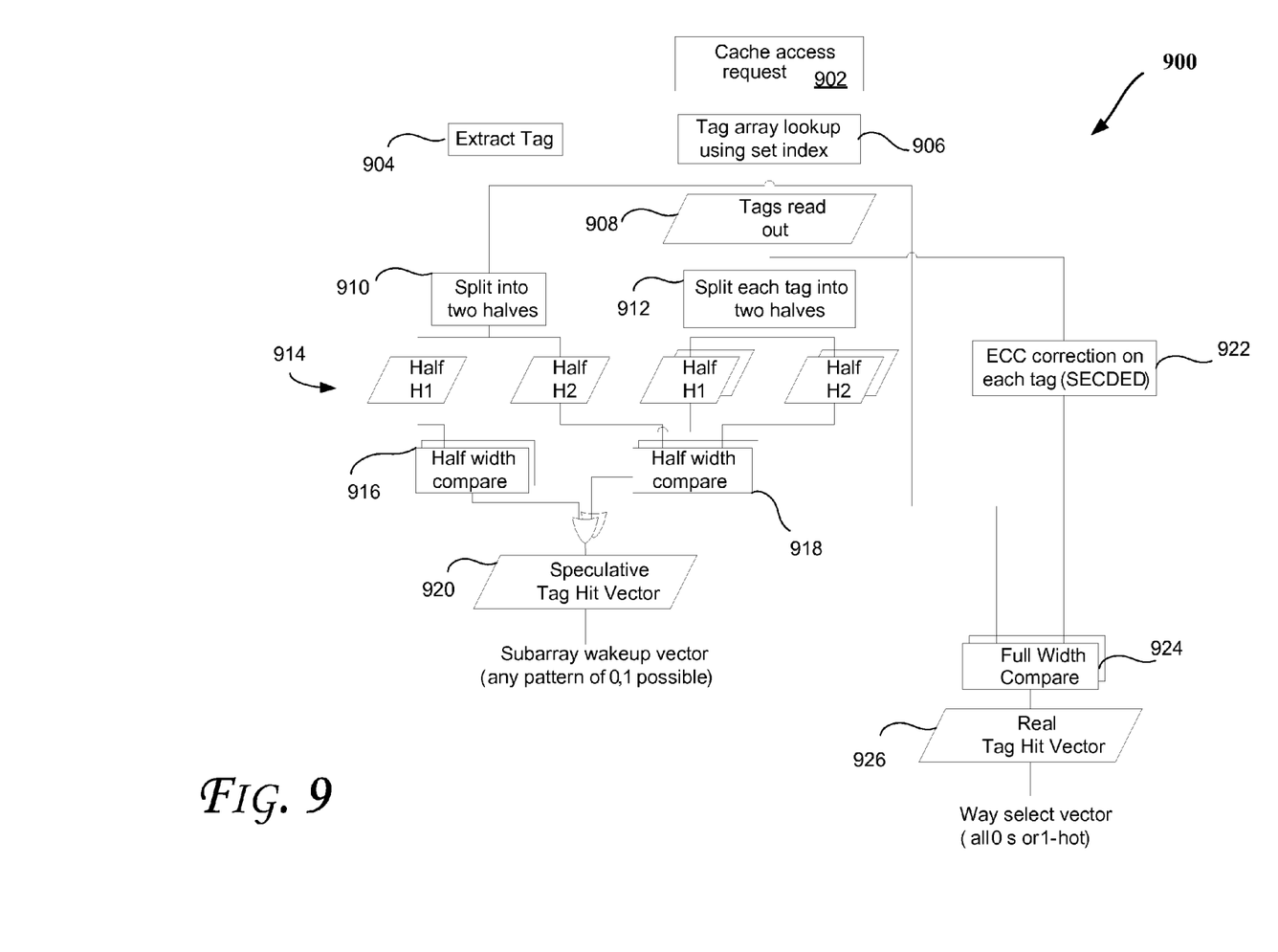
FIG. 9 illustrates a flow diagram of a method according to an embodiment.

More specifically, FIG. 9 illustrates a flow diagram of a method 900 using a speculative way hit scheme to reduce power according to an embodiment. In some embodiments, one or more components of FIG. 1-8 or 10-12 may be used to perform one or more operations of method 900. At an operation 902, a cache access request is received. Operations 904 and 906, respectfully, extract the tag corresponding to the cache access request and use a set index to look up in tag array corresponding to the cache access request. As shown, operations 904 and 906 may be performed in parallel in one embodiment. An operation 908 reads the tags based on the set index. Operations 910 and 912 split the tags into halves 914 which are then compared operations 916 and 918. They sub-array speculative wake up vector is then generated (at operation 920) based on the output of the comparisons 916 and 918 (e.g., by logically or-ing the outputs of the comparisons 916 and 918).

As illustrated in FIG. 9, at operation 922, ECC correction may be performed on each tag (e.g., using SECDED as discussed above). The output of the ECC correction 922 and tag extraction 904 may be used to perform a full width compare 924, which in turn provides a real tag hit vector 926 for a real/actual way selection vector. Moreover, even though FIG. 9 discusses halving the tags, other portions may also be used, such as quarter, etc.

Accordingly, some embodiments may reduce significant amount of the power at the overall chip level with no or marginal loss in performance. These savings in power could in turn be used to boost the processor core frequency to improve the performance of the overall chip. Also, a speculative cache way hit of a cache memory may be determined based on a pre ECC partial tag match (e.g., where tags are split as shown in FIG. 9, for example).

Figure 10:
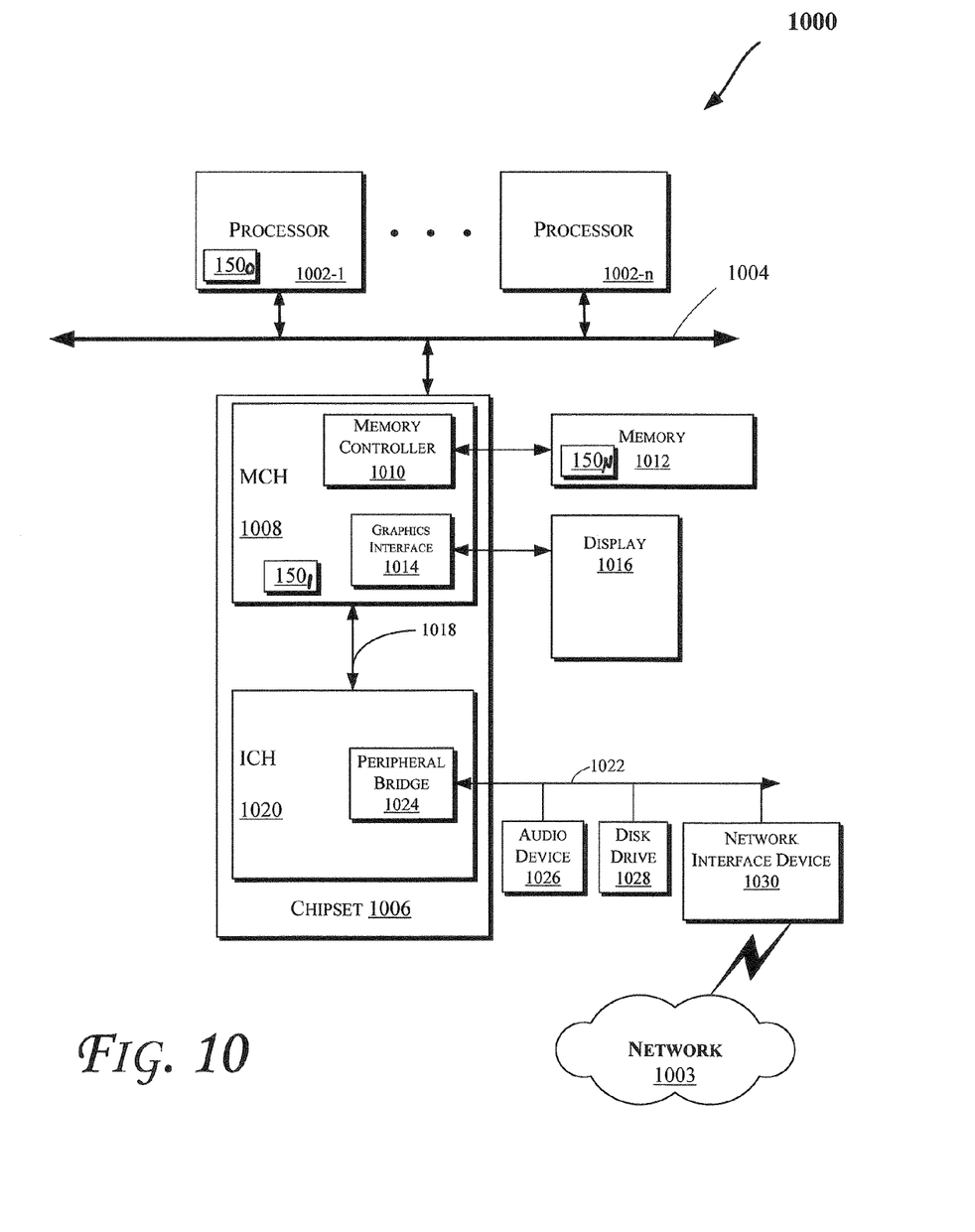
Figure 11:
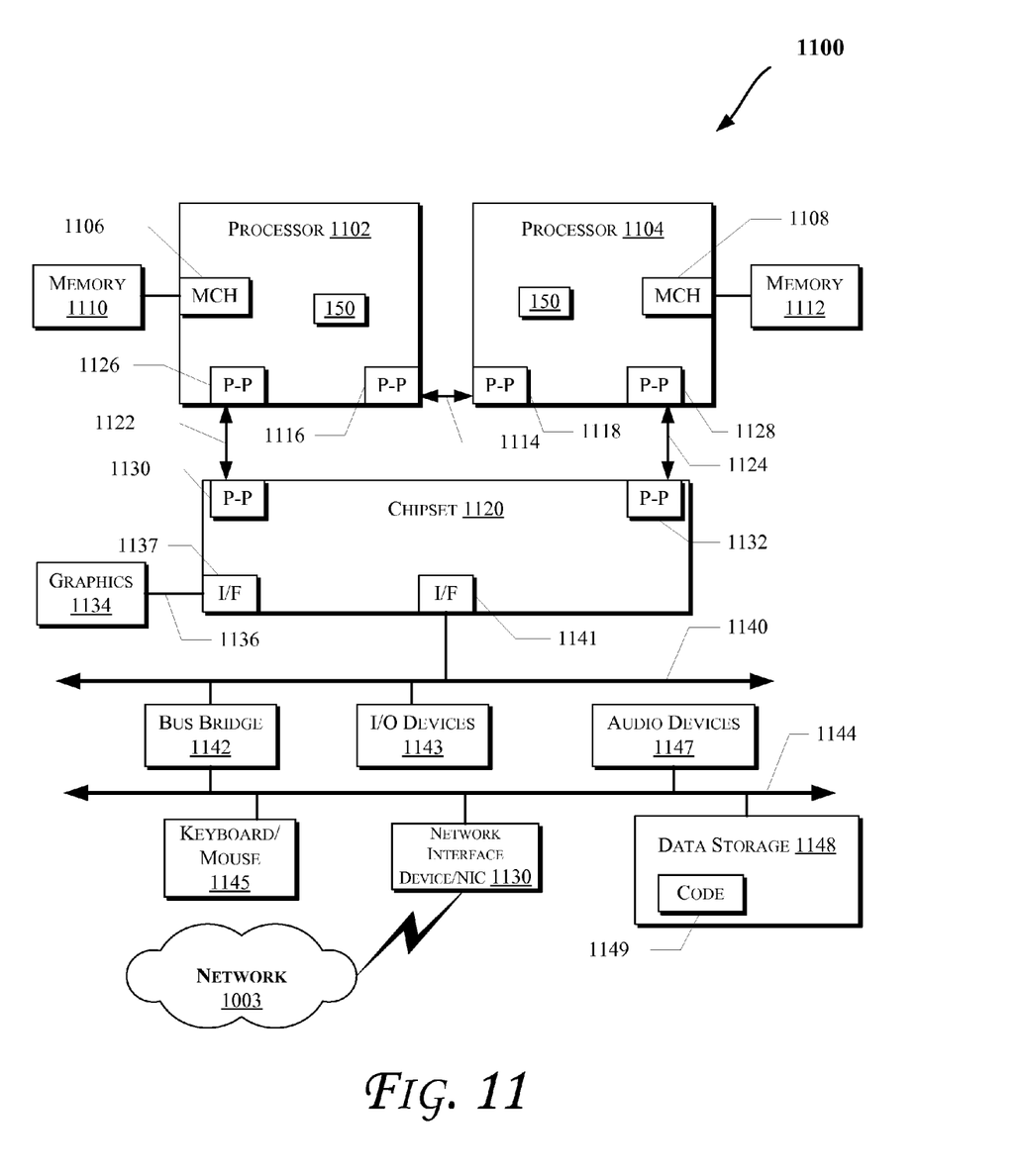

FIG. 10 illustrates a block diagram of an embodiment of a computing system 1000. In various embodiments, one or more of the components of the system 1000 may be provided in various electronic devices capable of performing one or more of the operations discussed herein with reference to some embodiments of the invention. For example, one or more of the components of the system 1000 may be used to perform the operations discussed with reference to FIGS. 1-9. Also, various storage devices discussed herein (e.g., with reference to FIGS. 1 and/or 11) may be used to store data, operation results, etc. Also, various components of system 1000 may include the logic 150. Even though presence of logic 150 is shown in some components of system 1000, logic 150 may be present in more or less components.

Moreover, the computing system 1000 may include one or more central processing unit(s) (CPUs) 1002 or processors that communicate via an interconnection network (or bus) 1004. The processors 1002 may include a general purpose processor, a network processor (that processes data communicated over a computer network 1003), or other types of a processor (including a reduced instruction set computer (RISC) processor or a complex instruction set computer (CISC)). Moreover, the processors 1002 may have a single or multiple core design. The processors 1002 with a multiple core design may integrate different types of processor cores on the same integrated circuit (IC) die. Also, the processors 1002 with a multiple core design may be implemented as symmetrical or asymmetrical multiprocessors. Moreover, the operations discussed with reference to FIGS. 1-9 and/or 11-12 may be performed by one or more components of the system 1000.

A chipset 1006 may also communicate with the interconnection network 1004. The chipset 1006 may include a memory control hub (MCH) 1008. The MCH 1008 may include a memory controller 1010 that communicates with a memory 1012. The memory 1012 may store data, including sequences of instructions that are executed by the CPU 1002, or any other device included in the computing system 1000. In one embodiment of the invention, the memory 1012 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1004, such as multiple CPUs and/or multiple system memories.

The MCH 1008 may also include a graphics interface 1014 that communicates with a display 1016. In one embodiment of the invention, the graphics interface 1014 may communicate with the display 1016 via an accelerated graphics port (AGP). In an embodiment of the invention, the display 1016 may be a flat panel display that communicates with the graphics interface 1014 through, for example, a signal converter that translates a digital representation of an image stored in a storage device such as video memory or system memory into display signals that are interpreted and displayed by the display 1016. The display signals produced by the interface 1014 may pass through various control devices before being interpreted and subsequently displayed on the display 1016.

A hub interface 1018 may allow the MCH 1008 and an input/output control hub (ICH) 1020 to communicate. The ICH 1020 may provide an interface to I/O devices that communicate with the computing system 1000. The ICH 1020 may communicate with a bus 1022 through a peripheral bridge (or controller) 1024, such as a peripheral component interconnect (PCI) bridge, a universal serial bus (USB) controller, or other types of peripheral bridges or controllers. The bridge 1024 may provide a data path between the CPU 1002 and peripheral devices. Other types of topologies may be utilized. Also, multiple buses may communicate with the ICH 1020, e.g., through multiple bridges or controllers. Moreover, other peripherals in communication with the ICH 1020 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1022 may communicate with an audio device 1026, one or more disk drive(s) 1028, and a network interface device 1030, which may be in communication with the computer network 1003. In an embodiment, the device 1030 may be a NIC capable of wireless communication. Other devices may communicate via the bus 1022. Also, various components (such as the network interface device 1030) may communicate with the MCH 1008 in some embodiments of the invention. In addition, the processor 1002 and the MCH 1008 may be combined to form a single chip. Furthermore, the graphics interface 1014 may be included within the MCH 1008 in other embodiments of the invention.

Furthermore, the computing system 1000 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1028), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1000 may be arranged in a point-to-point (PtP) configuration such as discussed with reference to FIG. 11. For example, processors, memory, and/or input/output devices may be interconnected by a number of point-to-point interfaces.

More specifically, FIG. 11 illustrates a computing system 1100 that is arranged in a point-to-point (PtP) configuration, according to an embodiment of the invention. In particular, FIG. 11 shows a system where processors, memory, and input/output devices are interconnected by a number of point-to-point interfaces. The operations discussed with reference to FIG. 1-10 or 12 may be performed by one or more components of the system 1100. Also, various components of system 1100 may include the logic 150. Even though presence of logic 150 is shown in some components of system 1100, logic 150 may be present in more or less components.

As illustrated in FIG. 11, the system 1100 may include several processors, of which only two, processors 1102 and 1104 are shown for clarity. The processors 1102 and 1104 may each include a local memory controller hub (MCH) 1106 and 1108 to couple with memories 1110 and 1112. The memories 1110 and/or 1112 may store various data such as those discussed with reference to the memory 1012 of FIG. 10.

The processors 1102 and 1104 may be any suitable processor such as those discussed with reference to the processors 1002 of FIG. 10. The processors 1102 and 1104 may exchange data via a point-to-point (PtP) interface 1114 using PtP interface circuits 1116 and 1118, respectively. The processors 1102 and 1104 may each exchange data with a chipset 1120 via individual PtP interfaces 1122 and 1124 using point to point interface circuits 1126, 1128, 1130, and 1132. The chipset 1120 may also exchange data with a high-performance graphics circuit 1134 via a high-performance graphics interface 1136, using a PtP interface circuit 1137.

At least one embodiment of the invention may be provided by utilizing the processors 1102 and 1104. For example, the processors 1102 and/or 1104 may perform one or more of the operations of FIG. 1-10 or 12. Other embodiments of the invention, however, may exist in other circuits, logic units, or devices within the system 1100 of FIG. 11. Furthermore, other embodiments of the invention may be distributed throughout several circuits, logic units, or devices illustrated in FIG. 11.

The chipset 1120 may be coupled to a bus 1140 using a PtP interface circuit 1141. The bus 1140 may have one or more devices coupled to it, such as a bus bridge 1142 and I/O devices 1143. Via a bus 1144, the bus bridge 1143 may be coupled to other devices such as a keyboard/mouse 1145, the network interface device 1130 discussed with reference to FIG. 11 (such as modems, network interface cards (NICs), or the like that may be coupled to the computer network 1003), audio I/O device, and/or a data storage device 1148. The data storage device 1148 may store code 1149 that may be executed by the processors 1102 and/or 1104.

Figure 12:
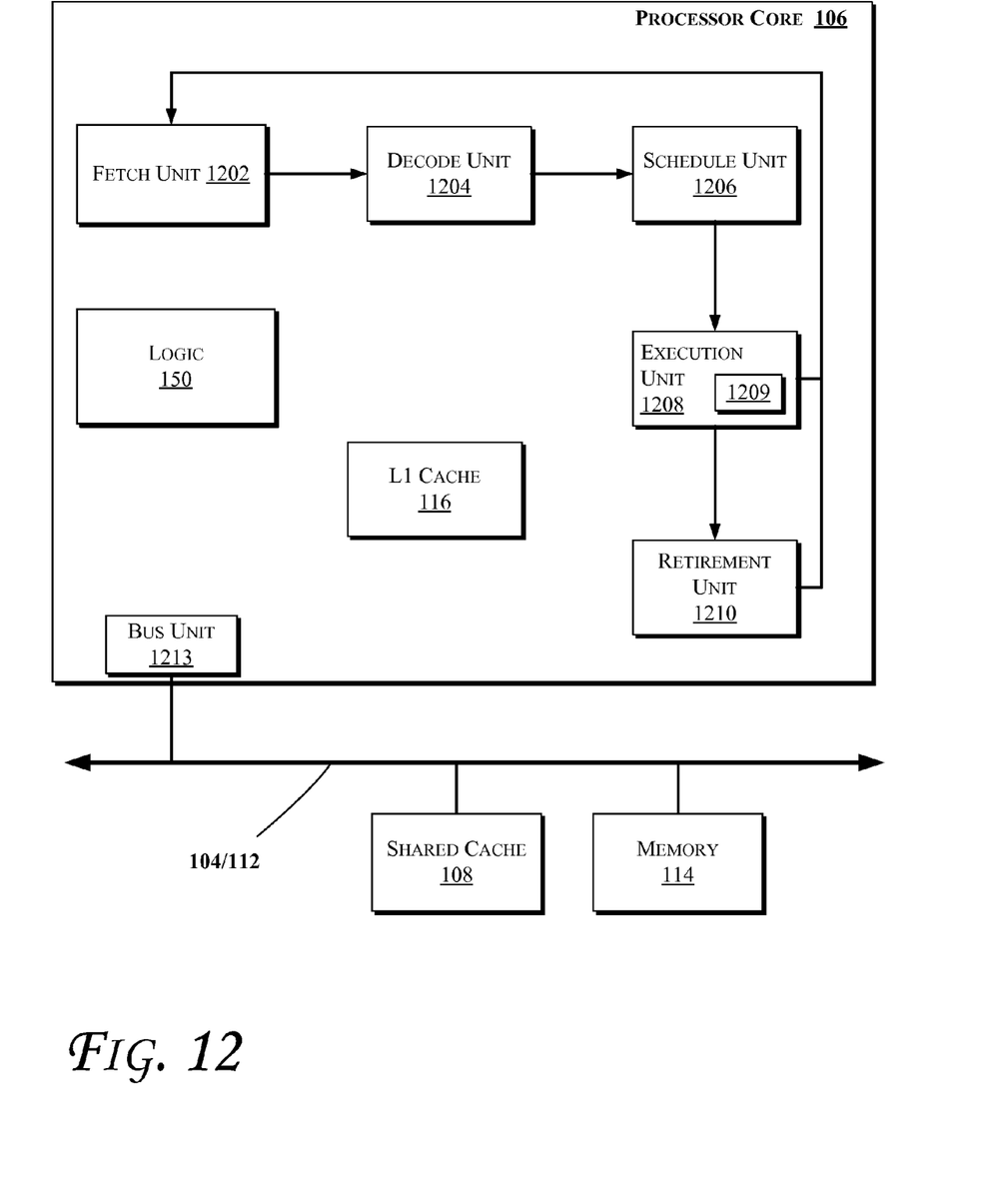
FIG. 12 illustrates a block diagram of portions of a processor core and other components of a computing system, according to an embodiment of the invention.

FIG. 12 illustrates a block diagram of portions of a processor core and other components of a computing system, according to an embodiment of the invention. In an embodiment, at least some of processors discussed herein (e.g., with reference to FIG. 1, 10, or 11) may include one or more of the component of the processor core 106 shown in FIG. 12. Also, a processor may include a single or multi-core 106, which may be homogeneous/symmetric or heterogeneous/asymmetric, etc. such as discussed herein, e.g., with reference to FIG. 1, 10, or 11. In one embodiment, the arrows shown in FIG. 12 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 12, the processor core 106 may include a fetch unit 1202 to fetch instructions for execution by the core 106. The instructions may be fetched from any storage devices such as the memory 114 and/or the memory devices discussed with reference to FIG. 10 or 11. The core 106 may optionally include a decode unit 1204 to decode the fetched instruction. In an embodiment, the decode unit 1204 may decode the fetched instruction into a plurality of uops (micro-operations). Some embodiments of the processor core 106 may not include decode unit 1204. Hence, the core 106 may process instructions without decoding them. Additionally, the core 106 may include a schedule unit 1206. The schedule unit 1206 may perform various operations associated with storing decoded instructions (e.g., received from the decode unit 1204) until the instructions are ready for dispatch, e.g., until all source values of a decoded instruction become available.

In one embodiment, the schedule unit 1206 may schedule and/or issue (or dispatch) decoded instructions to an execution unit 1208 for execution. The execution unit 1208 may execute the dispatched instructions after they are dispatched (e.g., by the schedule unit 1206) and, if applicable, decoded (e.g., by the decode unit 1204). In an embodiment, the execution unit 1208 may include more than one execution unit, such as one or more memory execution units, one or more integer execution units, one or more floating-point execution units (1809), or other execution units. The execution unit 1208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 1208.

Further, the execution unit 1208 may execute instructions out-of-order. Hence, the processor core 106 may be an out-of-order processor core in one embodiment. The core 106 may also include a retirement unit 1210. The retirement unit 1210 may retire executed instructions (e.g., in order) after they are committed. In an embodiment, retirement of the executed instructions may result in processor state being committed from the execution of the instructions, physical registers used by the instructions being de-allocated, etc.

The core 106 may further include the logic 150 (such as the logic 150 discussed with respect to any of the previous figures). Additionally, the core 106 may include a bus unit 1213 to allow communication between components of the processor core 106 and other components (such as the components discussed with reference to FIG. 1, 10, or 11) via one or more buses (e.g., buses 104 and/or 112).

In various embodiments of the invention, the operations discussed herein, e.g., with reference to FIGS. 1-12, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a storage unit to store a plurality of virtual tags, wherein each of the plurality of virtual tags is to correspond to a cache way from a plurality of cache ways of a cache; and
a first logic to determine whether to access a cache way of the plurality of cache ways based, at least in part, on a status of a corresponding virtual tag from the plurality of virtual tags, wherein at least a portion of each of the plurality of virtual tags is to identify whether the corresponding cache way is from a stack area or a heap area.

2. The apparatus of claim 1, wherein at least one of the plurality of virtual tags is a most significant bit of a virtual address corresponding to a cache way of the plurality of cache ways.

3. The apparatus of claim 1, wherein the cache is to be virtually-indexed and physically-tagged.

4. The apparatus of claim 1, wherein first logic is to determine whether to access the cache way based on a plurality of comparisons.

5. The apparatus of claim 1, further comprising a processor that is to comprise one or more of the first logic and the storage unit.

6. The apparatus of claim 5, wherein the processor is to comprise a plurality of processor cores and wherein at least one of the plurality of processor cores is to comprise one or more of the first logic or the storage unit.

7. The apparatus of claim 1, wherein the first logic is to determine a speculative cache way hit based on a pre Error Correction Code (ECC) partial tag match.

8. An apparatus comprising:
a processor that is to comprise one or more first logic and second logic;
the first logic to determine a speculative cache way hit of a cache memory based on a pre Error Correction Code (ECC) partial tag match, perform ECC correction on a tag and generate an actual way selection vector using the ECC corrected tag; and
the second logic to cause a portion of data arrays of the cache memory to wake up based on a result from the pre ECC partial tag match and the actual way selection vector, wherein at least a portion of the tag is to identify whether the corresponding cache way is from a stack area or a heap area.

9. The apparatus of claim 8, wherein the second logic is to cause the portion of the data arrays of the cache memory to wake up without firing any sense amplifiers of the portion of the data arrays.

10. The apparatus of claim 8, wherein a remaining portion of the data arrays of the cache memory are in a sleep mode or an accessed mode.

11. The apparatus of claim 10, wherein the accessed mode corresponds to an energizing of sense amplifiers of the remaining portion of the data arrays.

12. The apparatus of claim 10, wherein the sleep mode corresponds to a retention of cells of the cache memory at a retention minimum voltage level.

13. The apparatus of claim 8, wherein the processor is to comprise a plurality of processor cores and wherein at least one of the plurality of processor cores is to comprise one or more of the first logic or the second logic.

14. The apparatus of claim 8, wherein the first logic is to determine the speculative cache way hit of the cache memory based on split portions of the pre ECC partial tag match.

15. The apparatus of claim 8, wherein when the pre ECC partial tag match is a first value, the first logic is to cause the actual way selection vector to be the first value and when the actual way selection vector is a second value, the first logic is to cause the pre ECC partial tag match to be the second value.

16. A system comprising:
a cache memory to store data;
a storage unit to store a plurality of virtual tags, wherein each of the plurality of virtual tags is to correspond to a cache way from a plurality of cache ways of the cache memory; and
a first logic to determine whether to access a cache way of the plurality of cache ways based, at least in part, on a status of a corresponding virtual tag from the plurality of virtual tags, wherein at least a portion of each of the plurality of virtual tags is to identify whether the corresponding cache way is from a stack area or a heap area.

17. The system of claim 16, wherein at least one of the plurality of virtual tags is a most significant bit of a virtual address corresponding to a cache way of the plurality of cache ways.

18. The system of claim 16, further comprising an audio device coupled to the first logic.

19. The system of claim 16, wherein the cache memory comprises a plurality of cache slices coupled via a first uni-directional communication ring and a second uni-directional communication ring.

* * * * *